United States Patent [19]

Saban et al.

[11] Patent Number: 5,548,043

[45] Date of Patent: Aug. 20, 1996

[54] PROCESSES FOR PRODUCING BIMODAL TONER RESINS

[75] Inventors: Marko Saban, Etobicoke; George Liebermann, Mississauga; Thomas B. McAneney, Burlington, all of Canada

[73] Assignee: Xerox Corporation, Stamford, Conn.

[21] Appl. No.: 351,153

[22] Filed: Nov. 30, 1994

[51] Int. Cl.$^6$ ................... C08F 2/38; C08F 4/48
[52] U.S. Cl. ............... 526/84; 526/82; 526/173; 526/235; 526/335; 526/340; 525/271; 525/267; 525/242; 525/313; 525/388; 525/384; 528/483; 528/495
[58] Field of Search ............... 525/271, 388, 525/384, 267, 242; 526/173, 235, 340, 82, 84; 524/575; 528/483, 495

[56] References Cited

U.S. PATENT DOCUMENTS

| | | |
|---|---|---|
| 4,311,803 | 1/1982 | Smith et al. . |
| 4,469,770 | 9/1984 | Nelson . |
| 4,507,451 | 3/1985 | Freppel .................. 526/340 X |
| 4,581,429 | 4/1986 | Solomon et al. . |
| 4,725,654 | 2/1988 | Priddy et al. . |
| 4,752,819 | 6/1988 | Priddy et al. . |
| 4,845,165 | 7/1989 | Halasa et al. ................. 526/78 |
| 5,143,990 | 9/1992 | Gribler et al. ................. 526/82 |
| 5,158,851 | 10/1992 | Fuller et al. . |
| 5,166,028 | 11/1992 | Paine et al. . |
| 5,215,846 | 6/1993 | Fuller et al. . |
| 5,219,946 | 6/1993 | Tanikawa et al. . |
| 5,219,947 | 6/1993 | Yasuda et al. . |

Primary Examiner—Fred Teskin
Attorney, Agent, or Firm—Oliff & Berridge; Eugene O. Palazzo

[57] ABSTRACT

A one-step polymerization process for producing a bimodal resin having a distinct low molecular weight portion and a high molecular weight portion includes initiating an anionic polymerization of a monomer or monomers to produce living polymer chains, terminating a portion of the living polymer chains, and completing the polymerization of the remaining living polymer chains. The bimodal resin is useful, for example, in high gloss, low melt toner applications.

20 Claims, 2 Drawing Sheets

PROCESSES FOR PRODUCING BIMODAL TONER RESINS

BACKGROUND OF THE INVENTION

This invention relates to improved bimodal resin compositions useful for making electrostatographic toner compositions, and processes for producing the same, More particularly, this invention relates to one-step anionic polymerization processes for producing bimodal resin compositions, In embodiments of the present invention, there are described anionic polymerization processes that can be used to produce toner compositions in an economical manner. The bimodal resin compositions described in this invention include homopolymers or copolymers polymerizable by anionic polymerization, such as styrene/butadiene resin compositions. More specifically, the bimodal resin compositions obtained by the anionic polymerization processes of the present invention are characterized by a narrow molecular weight distribution of the two macromolecular species in the resin composition.

Bimodal toner resins are known in the art to be useful in electrophotography and related imaging techniques, Such bimodal toner resins are preferred for formulating certain toner compositions because they allow more specific tailoring of fusing characteristics of the resin as compared to monomodal resins. Most conventional toner resins are monomodal, with a relatively narrow to broad molecular weight distribution. Resins with a broad molecular weight distribution, i.e., a high degree of polydispersity (Mw/Mn or MWD) are often beneficial for improving certain fusing characteristics, such as fusing latitude. In some cases, bimodal toner resins can provide for more advantageous fusing characteristics than the monomodal resins with broad molecular weight distribution.

Bimodal toner resins, including bimodal styrene/acrylate toner resins, are known in the art. Processes used for making such bimodal toner resins involve a multi-step process. For example, U.S. Pat. Nos. 5,219,946 and 5,219,947 disclose bimodal binder resins and processes for producing such resins. Both of these patents disclose a process for producing the binder resin wherein a first stage resin (a polymer or copolymer) is prepared by solution polymerization. The first stage resin is then dissolved in a polymerizable monomer. In a second stage of the process, the polymerizable monomer is subjected to suspension polymerization in the presence of the first-stage resin and a cross-linking agent. The patents also disclose that such bimodal toner resins may be produced by thermo-mechanical mixing of two polymers having different molecular weights, although that process is not as preferred as the two-stage solution and suspension polymerization process. The molecular weight distribution of the binder resins produced by the process of the cited patents has a first peak in the region of molecular weight of from 2,000 to 10,000 and a second peak or shoulder in the region of molecular weight of from 15,000 to 100,000. The binder resins also have a molecular weight distribution (MWD) of greater than 5 and less than 80.

Processes for producing toner resins by anionic polymerization processes are also known in the art. For example, U.S. Pat. Nos. 5,158,851 and 5,215,846 disclose anionic polymerization processes for producing toner resins comprised of multiblock or liquid glass resin particles with a glass transition temperature of from about 20° C. to about 65° C. The multiblock or liquid glass type toner resins of the latter patents include segments of polystyrene and segments of polybutadiene. U.S. Pat. No. 4,581,429 discloses that although anionic polymerization provides satisfactory results in some circumstances, the process is difficult to apply on an industrial scale. For example, it is disclosed that the stringent reaction conditions required by the anionic polymerization process are difficult to attain on an industrial scale. Furthermore, it is disclosed that many monomers cannot be polymerized by an anionic process.

U.S. Pat. Nos. 5,166,028 and 4,469,770 describe styrene/butadiene copolymer resins, methods for their manufacture, and their use in toners and developers. U.S. Pat. No. 5,166,028 discloses a monomodal styrene/butadiene toner resin composition having a molecular weight of from about 10,000 to about 500,000 and a molecular weight distribution of from about 5 to about 120. The monomodal styrene/butadiene resin is produced in a dispersion polymerization process. U.S. Pat. No. 4,469,770 discloses a monomodal styrene/butadiene copolymer resin composition having a molecular weight of from about 45,000 to about 155,000 and a molecular weight distribution of about 7. The monomodal styrene/butadiene resin composition is produced in an emulsion polymerization process.

Although bimodal toner resins are known in the art, there continues to be a need for improved toner resin compositions, especially bimodal toner resin compositions with enhanced functional properties. Such bimodal toner resins are preferred for formulating toner compositions because they allow more specific tailoring of fusing characteristics of the resin as compared to monomodal resins. Thus, bimodal toner resins with more narrow molecular weight distributions allow for more advantageous fusing characteristics.

A need also continues to exist in the art for improved methods for producing such bimodal toner resins. Although methods are currently known for producing bimodal resins, such methods typically have inherent drawbacks that hinder their application in commercial uses. For example, the method of thermo-mechanical mixing of two polymers having different molecular weights typically results in an inhomogeneous mixture having less desirable fusing characteristics. As a further example, the two-stage polymerization process described above requires additional equipment and processing as compared to production methods for monomodal toner resins, and therefore increases the cost of producing bimodal resins. For example, Arthur S. Diamond and Lynn S. Ritter, "Toner in the '90S: The Shape Of The Things To Come," pp. 121–122 disclosed that the price for a styrene/acrylate bimodal resin in January, 1989, was about $1.75 per pound, as compared to $1.25 per pound for a conventional (monomodal) resin. The cost of the bimodal resin is thus 40% higher than for the comparable monomodal resin.

Anionic polymerization processes are known to require more stringent purity and reaction conditions. Nevertheless, there is an established commercial styrene/butadiene and styrene/isoprene anionic polymer market with prices of the polymers close to the range of other commodity polymers. A need continues to exist, however, for improved anionic polymerization processes for special applications, such as toner resins.

SUMMARY OF THE INVENTION

The present invention provides bimodal resin compositions that overcome the above-described problems and disadvantages of conventional resins.

The present invention provides one-step processes for preparing bimodal resins by anionic polymerization. The one-step polymerization processes provide for preparation of bimodal resins, such as styrene/butadiene resins, in a controlled fashion, thus allowing tailoring of the fusing properties of the resin by adjusting the molecular weight, glass transition temperature and chemical composition of the low and high molecular weight domains of the material.

In embodiments of the present invention, the one-step polymerization processes allow for the production of bimodal resins with a separation factor of two between the low molecular weight and high molecular weight material. Other embodiments of the present invention provide for the production of bimodal resins with a separation factor less than or greater than two between the low molecular weight and high molecular weight domains. The present invention also provides processes for the production of bimodal resins in which the molecular weight distribution of both the low and the high molecular weight component is very narrow, for example in the range of from about 1.05 to about 1.20.

Specifically, this invention provides one-step polymerization processes for producing a resin, comprising:

(a) initiating an anionic polymerization of a monomer or monomers to produce living polymer chains;

(b) terminating a first portion of said living polymer chains; and (c) completing the polymerization of a remaining portion of said living polymer chains; wherein said resin is a bimodal resin having a distinct low molecular weight portion and a high molecular weight portion.

The termination step (c) may be carried out as an air termination step, comprising adding air, or oxygen in a controlled fashion, to the reaction mixture to cause termination of a portion of the living polymer chains. The result is a doubling of the molecular weight of this portion of the polymer by bringing two living polymer chains together. If the remaining living polymer chains are terminated by other species or with a quenchant, a bimodal resin with a separation factor of two between the low molecular weight and high molecular weight material is obtained.

The termination step (c) may also be carried out by adding a quenchant to the reaction mixture to cause termination of a portion of the living polymer chains. The remaining living polymer chains may be permitted to continue to react with additional monomer or monomers to form the higher molecular weight component with the desired molecular weight. This method of producing bimodal polymers or copolymers is described as a polymerization-partial termination-polymerization procedure.

The bimodal resins produced by the process of the present invention are suitable for use in producing toner and developer compositions for electrostatographic imaging applications. The resins are particularly useful for high gloss (black or color), low melt toner applications.

DETAILED DESCRIPTION OF PREFERRED EMBODIMENTS

Figure 1:
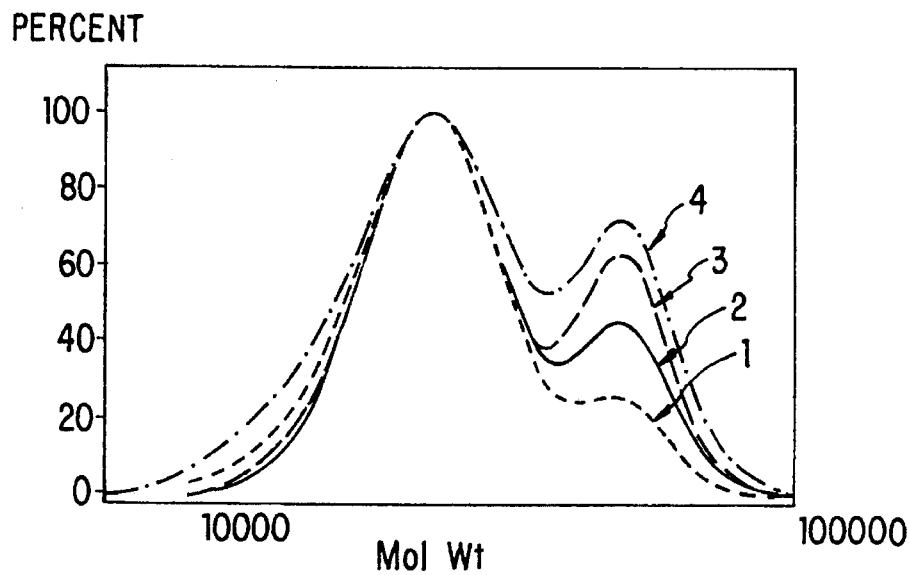
FIG. 1 shows GPC (gel permeation chromatography) traces of resin composition samples from the process of Example 1.

The processes of the present invention produce bimodal toner resins having a separation factor of about two between the low molecular weight and high molecular weight material, or a separation factor of less than or greater than two between the low molecular weight and high molecular weight material. The bimodal toner resins are produced by modified one-step anionic polymerization processes.

The processes of the present invention may be used to produce bimodal resins having widely variant low molecular weight and high molecular weight components. For example, the processes of the present invention may provide a bimodal resin having a low molecular weight component in the molecular weight range of from about 1,000 to about 200,000 or higher, while the high molecular weight component may be in the molecular weight range of from about 2,000 to about 1,000,000 or higher. As used herein, "low" and "high" are used to refer to the respective molecular weight components of the bimodal resins. Thus, for a given resin composition, the component having a lower molecular weight with respect to the other component is referred to as the "low molecular weight component" and the other component is therefore referred to as the "high molecular weight component."

Specifically, the anionic polymerization process may involve either a polymerization-partial termination-polymerization procedure, or an air (oxygen) termination procedure to partially terminate the living polymer chains.

The air termination procedure allows for production of a toner resin having a separation factor of about 2 between the low molecular weight and high molecular weight material. That is, the high molecular weight material has a weight average molecular weight of about twice the weight average molecular weight of the low molecular weight material. The addition of air, or oxygen in a controlled fashion, to the reaction mixture causes termination of a portion of the living polymer chains, resulting in a doubling of the molecular weight of this portion of the polymer. If the remaining living polymer chains are terminated by other species, including impurities in the air, or with a quenchant, a bimodal resin with a separation factor of two between the low molecular weight and high molecular weight material is obtained. The relative amounts, or ratio, of the low and high molecular weight components may be adjusted by the amount of air (or oxygen) introduced into the system. It is also possible to continue the anionic polymerization of the remaining (non-terminated) lower molecular weight living polymer chains. If not all of the polymer chains are terminated, and the non-terminated polymer chains are permitted to continue to polymerize, the result is a multimodal molecular weight distribution, with a reduction in the separation factor between the two polymer fractions.

The polymerization-partial termination-polymerization procedure produces a toner resin having a controllable separation factor of from about 1.1 to about 100 between the low molecular weight and high molecular weight materials. Additionally, the anionic polymerization step following the partial termination of living polymer chains may be controlled to provide a polymer resin having a separation factor of significantly greater than two between the low molecular weight and high molecular weight materials. The addition of a controlled amount of a quenchant to the reaction mixture causes termination of a portion of the living polymer chains to form the low molecular weight component of the bimodal resin. The remaining living polymer chains may continue to react with additional monomer or monomers to form the higher molecular weight component with the desired molecular weight. Thus, the timing of addition of the quenchant determines the molecular weight of the low molecular weight fraction, and the amount of quenchant introduced into the reaction determines the amount of the low molecular weight material. The extent to which the anionic polymerization of the remaining living polymer is continued by addition of fresh monomer or monomers will determine both the amount and the molecular weight of the high molecular weight component of the bimodal resin.

In the polymerization-partial termination-polymerization procedure, it is also possible to produce a bimodal resin having a separation factor between the low and high molecular weight materials of less than two. Such low separation factors between the two molecular weight components may be achieved because after terminating a portion of the living polymer chains with a quenchant, the remaining living polymer chains continue to grow to form the high molecular weight portion. Therefore, if the remaining living polymer chains continue to grow only to a small extent, the separation factor between the low and high molecular weight materials may be less than two. However, for better fusing latitude, a separation factor between the low and high molecular weight portions of greater than two is preferred in embodiments of the present invention. Even more preferred is that the separation factor be from about two to about ten.

By adjusting the anionic polymerization process as discussed above, it is possible to tailor the fusing properties of the resin. Specifically, the modified one-step anionic polymerization process of the present invention allows for tailoring of the resin's molecular weight, glass transition temperature and chemical composition of the low and high molecular weight portions of the material.

The monomers, polymers and copolymers that may be used in the present invention may include any such monomers, polymers or copolymers that are suitable for use in conventional anionic polymerization processes. Examples of monomers suitable for use in the polymerization process of the present invention include, but are not limited to, conjugated dienes and vinyl monomers. Typical examples of conjugated diene monomeric units include, but are not limited to, 1,3-butadiene, isoprene, 2,3-dimethyl-1,3-butadiene, piperylene, 3-butyl-1,3-octadiene, 2-phenyl-1,3-butadiene and the like, and mixtures thereof. Typical examples of vinyl monomeric units include, but are not limited to: styrene; p-chlorostyrene; vinyl naphthalene; vinyl chloride; vinyl bromide; vinyl fluoride; ethylenically unsaturated monoolefins such as ethylene, propylene, butylene, isobutylene and the like; vinyl esters such as vinyl acetate, vinyl propionate, vinyl benzoate, vinyl butyrate, and the like; esters of alphamethylene aliphatic monocarboxylic acids such as methyl acrylate, ethyl acrylate, n-butyl acrylate, isobutyl acrylate, dodecyl acrylate, n-octyl acrylate, 2-chloroethyl acrylate, phenyl acrylate, methyl-alphachloroacrylate, methyl methacrylate, ethyl methacrylate, butyl methacrylate and the like; acrylonitrile; methacrylonitrile; acrylamide; vinyl ethers such as vinyl methyl ether, vinyl isobutyl ether, vinyl ethyl ether and the like; vinyl ketones such as vinyl methyl ketone, vinyl hexyl ketone, methyl isopropenyl ketone and the like; vinylidene halides such as vinylidene chloride, vinylidene chlorofluoride and the like; N-vinyl indole; N-vinyl pyrrolidone; N-vinyl pyridine, mixtures thereof, and the like.

Specifically preferred monomers selected for the modified anionic polymerization process and bimodal resin of the present invention include styrene, butadiene, isoprene, and derivatives thereof.

The monomers may be polymerized into an appropriate toner resin by the one-step anionic polymerization processes of the present invention. Anionic polymerization allows for the preparation of random, block, tailored block or multi-block copolymers with precise control of molecular weight stereochemistry of the monomer components, and monomer content and sequence. This high degree of structural control is made possible because anionic polymerization conditions generate "living" polymers wherein the monomer units may be added to the living macromolecular chain during the polymerization process in a controlled fashion. Hence, unique copolymer compositions may be prepared as illustrated herein.

Furthermore, the molecular weight, molecular weight distribution and melt rheology may be favorably altered in the resulting copolymer resin to yield improved performance properties when the resin is formulated into, for example, low melt toner compositions.

Generally, the bimodal polymer resins of the present invention in embodiments are prepared in an anionic polymerization process. Anionic polymerization processes to produce toner resins are disclosed, for example, in U.S. Pat. Nos. 5,158,851 and 5,215,846, the entire disclosures of which are incorporated herein by reference. Generally, the anionic polymerization process is conducted by first generating an appropriate anionic initiator in an appropriate solvent, cooling the reaction vessel with the initiator and solvent to the desired reaction temperature, simultaneously or sequentially feeding the reactant monomers into the reaction vessel, allowing the polymerization reaction to proceed to completion, and isolating the products of the polymerization reaction. According to the present invention, in order to obtain bimodal polymer compositions, the process is modified by partially terminating a portion of the living polymer chains during the polymerization process, as will be described below.

An appropriate anionic initiator system can be formed, for example, by combining sodium or lithium metal or an organolithium compound with a vinyl substituted aromatic compound or an aromatic compound containing active hydrogen. Although sodium or lithium metal, or organolithium compounds, are known anionic initiators, the formation of initiator systems is a well known technique in the art. The organolithium compound may include, but is not limited to, an alkyl lithium compound with, for example, an alkyl group of from 1 to about 20 carbon atoms; an aryl lithium compound with, for example, an aryl group of from 6 to about 24 carbon atoms, such as phenyl or naphthyl; and the like. Preferred examples of alkyl lithium or aryl lithium compounds include butyllithiums such as n-butyllithium and sec-butyllithium, phenyl lithium, and the like.

The vinyl substituted aromatic compound may include, but is not limited to, such compounds containing at least one or more reactive double bonds. Preferred examples of vinyl substituted aromatic compounds containing at least one and preferably two or more reactive double bonds include styrene, alpha-methyl styrene, di-isopropenyl benzene, tri-isopropenyl benzene, tetraisopropenyl benzene, and the like. The vinyl substituted aromatic compound may also include, but is not limited to, such compounds containing active hydrogens. The compounds containing active hydrogens will be metallated in the presence of the lithium metal or the lithium compound. Preferred examples of aromatic compounds containing active hydrogens include, but are not limited to, naphthalene, anthracene, phenanthracene, and the like.

The alkyl lithium or aryl lithium compound can be added in an appropriate stoichiometry such that the molar equivalents of lithium compound are equal to the number of reactive double bond equivalents or active hydrogen equivalents contained in the vinyl substituted aromatic compound or active hydrogen containing aromatic compound, respectively. The solvents employed may be comprised of single solvents, or mixtures of polar aprotic solvents, for example tetrahydrofuran, diethyl ethers and dimethoxy ethane, and non-polar aprotic solvents, for example cyclohexane, hexanes, ethylbenzene, and the like. An anionic initiator system is thus formed in situ, as evidenced, for example, by an intense red color indicative of the presence of reactive vinyl substituted aromatic anion species. It is known in the art that anionic initiators are very reactive and their reactive concentration will decrease significantly due to reaction with traces of water, oxygen or other impurities present in the solvent or in the reactor. There are many techniques such as distillation or drying of the solvents or monomers, conditioning of the reactor, and others, which are practiced in the industry in order to reduce any undesired side reactions of the initiators or of the living polymer.

The anionic polymerization is initiated by the addition to the initiator system in the solvent, at the desired temperature, of the monomer or monomers. The monomer or monomers are preferably added at a controlled rate, and preferably in a solvent. The solvents employed for adding the monomer or monomers may generally be the same solvent used in the preparation of the initiator system, such as single solvents, or mixtures of polar aprotic solvents, for example tetrahydrofuran, diethyl ethers and dimethoxy ethane, and non-polar aprotic solvents, for example cyclohexane, hexanes, ethyl benzene, and the like. The addition of monomer or monomers may be performed sequentially, for example using solutions containing the individual or mixed monomers, or simultaneously by the addition, for example, of a solution containing two or more monomers. In the case of using more than one monomer, the order of addition of the reactants, the rate of addition, the time interval between sequential additions, and relative reaction ratios of reactant monomers (the relative rate at which the reactants react with the initiator or the growing polymer chain) can determine the discrete structure of the polymer composite formed.

In the case of two monomers being polymerized to form a bimodal copolymer resin, the molar equivalent ratio of reactive monomers ranges in embodiments of the present invention from about 20 to 1 or more to about 1 to 20 or less depending, for example, upon the rheological properties desired in the final copolymer resin. A reactive monomer molar equivalent ratio of from about 10 to 1 to about 1 to 10 is preferred.

The amount of initiator employed in the reaction relative to the reactive monomer or monomers is strictly controlled in order to obtain the desired molecular weight. Typical molar equivalent ratios of initiator to reactive monomer are from about 1 to 10 to about 1 to 100; a ratio of about 1 to 50 to about 1 to 70 being preferred. Formation of the active initiator can be performed at about room temperature and above, or at sub-zero temperatures, depending on the reactivity of the reagents. For example, a temperature of between about −70° C. and about 100° C. can be used for formation of the active initiator system, and temperatures of between about −40° C. and about 75° C. are preferred.

The polymerization conditions may be selected in order to achieve a desired regiochemistry of the product. For example, in the polymerization reaction of styrene and butadiene monomers, the regiochemistry of the resultant copolymer may be adjusted by proper selection of the solvent. If, for example, cyclohexane solvent is used exclusively in the reaction, a high 1,4-olefinic butadiene isomer content is obtained under conditions including a reaction temperature of from about 0° C. to about 100° C., and preferably about 50° C. High 1,2-butadiene isomer content may be achieved by carrying out the polymerization reaction at low temperatures, for example, in the range of from about −70° C. to about 25° C., and preferably from about −40° C. to about 0° C., in the presence of polar aprotic solvents, such as for example, tetrahydrofuran, diethylether, triethylamine, anisole, diphenylether, and the like. These solvents affect the microstructure of polybutadiene (e.g., the ratio of 1,2- to 1,4-butadiene isomer) when added to the reaction mixture in concentrations of from about 1 to about 100%. Such microstructure effects of polar aprotic solvents are described, for example, in L. Siggel et al., *Makromol. Chem. Macromol. Symp.*, V. 65, 243–254 (1993), the entire disclosure of which is incorporated herein by reference.

The "living" polymerization reaction mixture is indicated by the presence of a "living anion" color (an intense red color in the case of vinyl substituted aromatic species) throughout all of the process steps of initiation, propagation (polymerization), partial termination and continuing polymerization. Different color schemes are observed depending upon the various monomers or initiators used in the reaction. After all of the scheduled partial terminations and additions of monomers are accomplished, the reaction mixture is preferably treated with a quenching agent, such as a polar aprotic solvent, for example methanol, or a secondary reactant. The disappearance of the color signals the full termination of the anionic polymerization, i.e., the disappearance of the anionic species.

The products of the polymerization reaction can be isolated by known techniques, such as precipitation in a non-solvent, or solvent removal by distillation in specially designed equipment, in nearly quantitative yields. The polymer resin may be purified as necessary by repeated washing, dissolution and reprecipitation, or other known polymer purification techniques. The bimodal polymer products may be identified and characterized using standard methods, such as gel permeation chromatography (GPC), which are well known in the art.

Reaction conditions, parameters and regioselectivity for other monomer systems are analogous to those known in the art and/or may be ascertained by routine experimentation.

In the one-step polymerization processes of the present invention, a monoinitiator may be used to produce random, tapered or block copolymers with narrow polydispersities. For example, where styrene and butadiene monomers are polymerized to form a bimodal styrene/butadiene copolymer resin, and a constant composition mixture of the two monomers is added, the slower incorporation rate of the styrene results in random copolymers having a tapered butadiene end. By manipulating the addition of styrene and butadiene, a large number of compositions may be produced. For example, by starting the anionic polymerization process with only styrene, and performing a partial termination with a quenchant, followed by a polymerization of the remaining "living" polystyrene with a mixture of styrene and butadiene, there is obtained a bimodal polymer composite containing a low molecular weight component of polystyrene, and a high molecular weight component of styrene/butadiene copolymer.

The bimodality in resins of the present invention is produced by a partial and complete termination of living copolymer chains, for example, using the air termination procedures or the polymerization-partial termination-polymerization procedures described below.

Incorporation of an air (oxygen) termination procedure into the anionic polymerization process allows for the formation of a bimodal resin with a separation factor of about two between the low and the high molecular weight material. That is, the molecular weight of the high molecular weight peak is about twice the molecular weight of the low molecular weight peak. Each of the high and low molecular weight material may have a narrow polydispersity, typically having a MWD less than or equal to about 1.2. Typically, the anionic polymerization process is carried out in a reactor vessel under an inert atmosphere, such as a dry nitrogen blanket. In the air termination procedure of the present invention, all of the reactant monomers are fed into the reactor and the polymerization process is permitted to proceed for a period of time, at which time air is selectively introduced into the reaction vessel. The amount of air (or oxygen) introduced into the reaction vessel is controlled so that it results in partial termination of the living polymer by coupling the polymer chains, roughly doubling the molecular weight of this portion of the polymer. Therefore, the amount of air added to the reaction will control the amount of the high molecular weight component formed. The amount of air or oxygen required for obtaining a certain amount of high molecular weight material is best determined experimentally for each polymer system. The timing of the air termination, for example after a certain amount of monomer or monomers has been polymerized, may be chosen such as to obtain the desired molecular weight of both the low and high molecular weight components. If unpurified air is used for the termination step, as described in Example 1, the impurities in the air, including water, will cause a standard termination of some of the living polymer chains to form the low molecular weight component of the bimodal polymer composite. It is therefore important to use a controlled purity air or oxygen in order to obtain reproducible results by this method.

In the case of the polymerization-partial termination-polymerization procedure of the present invention, a bimodal resin may be produced having a wide range of separation factors between the low and the high molecular weight material. Similar to the air termination procedure described above, both the high molecular weight and the low molecular weight material may have narrow polydispersites, typically having a MWD less than or equal to about 1.2, and the polymerization-partial termination-polymerization procedure involves a partial termination of the polymer chains in the reaction.

In the polymerization-partial termination-polymerization procedure, a portion of the monomers is added to the reactor and allowed to polymerize for a period of time, after which some of the living polymer chains are terminated by the addition of a quenchant. The polymer chains terminated by the quenchant form the low molecular weight component of the bimodal resin. The number average molecular weight of the low molecular weight component ($Mn_1$) can be calculated from the formula $$Mn_1 = (mX)/(IE) \quad (1)$$

where m is the mass of monomers added to the reactor in g, X is monomers conversion (from 0 to 1), 1 is amount of initiator in mol, and E is initiator efficiency, generally ranging from about 0.7 to about 1.0, and typically about 0.9.

Following the partial termination of the polymer chains, monomer(s) feed is resumed to the reactor and the unreacted monomers are allowed to fully polymerize to complete the reaction and to form the high molecular weight component of the resin. The molecular weight increase ($\Delta Mn$) between the low molecular weight component and the high molecular weight component can be calculated from the formula $$\Delta Mn = m(1-X)/[1(1-T)E] \quad (2)$$

where T is the extent of polymer chain termination (from 0 to 1). Finally, the number average molecular weight of the high molecular weight component of the resin ($Mn_2$) can be calculated from the formula $$Mn_2 = Mn_1 + \Delta Mn \quad (3)$$

and the separation factor (F) between the low and the high molecular weight component from the formula $$F = Mn_2/Mn_1 \quad (4)$$

where $Mn_1$ and $Mn_2$ are as described above. By adjusting the mass of monomers fed into the reactor for polymerization (m), the timing and extent of polymer chain termination (T), as well as the mass of monomer or monomers added after the partial termination (X), the bimodality and molecular weight properties of the resultant copolymer resin may be controlled.

In the partial termination procedure, the quenchant may be any compound suitable for partially terminating the living polymer chains. For example, the quenchant may include, but is not limited to, any aliphatic or aromatic alcohols and mixtures thereof. Typical examples of aliphatic alcohols are methanol, ethanol, 1-propanol, 2-propanol, 1-butanol, 2-butanol, and the like. Typical examples of aromatic alcohols are phenol, 2-methlyphenol, 3-methlyphenol, 4-methlyphenol and the like.

Figure 2:
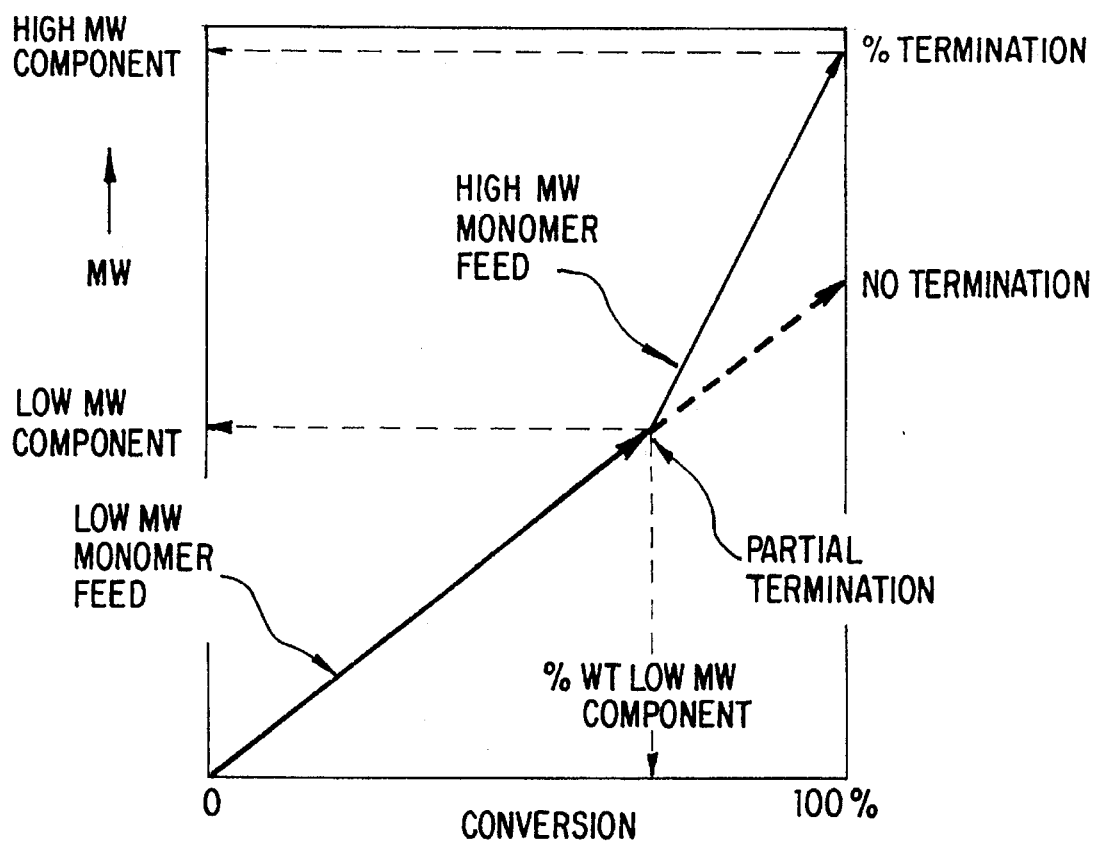
FIG. 2 is a general schematic diagram showing an anionic polymerization process using the polymerization-partial termination-polymerization procedure; showing the relationship between the percent conversion and molecular weight of the low molecular weight component and the percent termination and molecular weight of the high molecular weight component.

For example, FIG. 2 demonstrates the general relationship between the percent conversion of the monomer feed prior to partial termination and the molecular weight of the low molecular weight component. FIG. 2 also shows the general relationship between the percent termination of the living polymer chains and the molecular weight of the high molecular weight component. For example, as the percent conversion at which the reaction is halted and the living polymer chains are terminated decreases, the molecular weight of the low molecular weight component also decreases and the separation factor between the low molecular weight component and the high molecular weight component increases.

After the polymerization reaction is continued and the feed of the monomer is resumed, the high molecular weight component of the bimodal resin is formed. Thus, adjusting the percent of the living polymer chains that are terminated adjusts the molecular weight of the high molecular weight component.

The relationships between the percent termination, percent conversion and molecular weights of the low and high molecular weight components can be described by referring to four cases of the process. These four cases assume the identical monomer feeds in each case and are as follow:

Case 1—moderate to high conversion of monomers (X=0.5 to 0.9) followed by a low to moderate percent termination (T=0.1 to 0.5) of living polymer chains: By terminating a small portion of the polymer chains late in the polymerization process, the low molecular weight component will have a relatively high molecular weight. Due to the small percent termination, the high molecular weight component will have a molecular weight of from about 1.1 to about 3 times higher than the low molecular weight component. The weight percent of the low molecular weight component therefore depends upon the total monomer(s) mass (m) and the degree of monomer conversion (X). For example, for 100 g of monomer (m=100), 0.005 mol of initiator (I=0.005) with initiator efficiency of 90% (E-0.9), and with 30% termination (T=0.3) of living polymer chains, the following low molecular weight component $Mn_1$ and separation factor F can be calculated from equations (1)–(4):

| X | $Mn_1$ | F |
|---|--------|------|
| 0.5 | 11,100 | 2.43 |
| 0.6 | 13,300 | 1.95 |
| 0.7 | 15,600 | 1.61 |
| 0.8 | 17,800 | 1.36 |
| 0.9 | 20,000 | 1.16 |

Case 2—low to moderate conversion of monomers (X=0.1 to 0.5) followed by a low to moderate percent termination (T=0.1 to 0.5) of living polymer chains: By terminating a small portion of the polymer chains earlier in the polymerization process, the low molecular weight component will have a relatively low molecular weight, lower than in case 1. Assuming the same percent termination as in case 1, the small percent termination results in the high molecular weight component having a molecular weight of from about 2 to about 20 times higher than the low molecular weight component, while the weight percent and the molecular weight of the low molecular weight component will be lower than in case 1. For example, for 100 g of monomer (m=100), 0.005 mol of initiator (I=0.005) with initiator efficiency of 90% (E=0.9), and with 30% termination (T=0.3) of living polymer chains, the following low molecular weight component $Mn_1$ and separation factor F can be calculated from equations (1)–(4):

| X | $Mn_1$ | F |
|---|--------|------|
| 0.1 | 2,200 | 13.85 |
| 0.2 | 4,400 | 6.71 |
| 0.3 | 6,700 | 4.33 |
| 0.4 | 8,900 | 3.14 |
| 0.5 | 11,100 | 2.43 |

Case 3—moderate to high conversion of monomers (X=0.5 to 0.9) followed by moderate to high percent termination (T=0.5 to 0.9) of living polymer chains: By terminating a large portion of the polymer chains late in the polymerization process, the low molecular weight component will have a relatively high molecular weight, and the high molecular weight component will have a separation factor from the low molecular weight component of more than two but less than about ten. Assuming the same percent conversion as in case 1, the low molecular weight component will have the same molecular weight as in case 1. However, the large percent termination results in a separation factor between the low and high molecular weight components of much greater than in case 1. Furthermore, the weight percent of the low molecular weight component will be higher than in case 1, because a greater number of terminated polymer chains have the same molecular weight. For example, for 100 g of monomer (m=100), 0.005 mol of initiator (I=0.005) with initiator efficiency of 90% (E=0.9), and with 90% termination (T=0.9) of living polymer chains, the following low molecular weight component $Mn_1$ and separation factor F can be calculated from equations (1)–(4):

| X | $Mn_1$ | F |
|---|--------|------|
| 0.5 | 11,100 | 11.00 |
| 0.6 | 13,300 | 7.67 |
| 0.7 | 15,600 | 5.29 |
| 0.8 | 17,800 | 3.50 |
| 0.9 | 20,000 | 2.11 |

Case 4—low to moderate conversion of monomers (X-0.1 to 0.5) followed by a moderate to high percent termination (T=0.5 to 0.9) of living polymer chains: By terminating a large portion of the polymer chains early in the polymerization process, the low molecular weight component will have a low molecular weight, and the product will have the greatest separation factor between the low and high molecular weight components. Assuming the same percent conversion as in case 2 and the same percent termination as in case 3, the low molecular weight component will have the same molecular weight as in case 2. However, the large percent termination results in a much greater amount of low molecular weight component, and greater separation factor between the low and high molecular weight components. The weight percent of the low molecular weight component will be higher than in case 2, because a greater number of terminated polymer chains have the same molecular weight. For example, for 100 g of monomer (m=100), 0.005 mol of initiator (I=0.005) with initiator efficiency of 90% (E=0.9), and with 90% termination (T=0.9) of living polymer chains, the following low molecular weight component $Mn_1$ and separation factor F can be calculated from equations (1)–(4):

| X | $Mn_1$ | F |
|---|--------|------|
| 0.5 | 11,100 | 11.00 |
| 0.4 | 8,900 | 16.00 |
| 0.3 | 6,700 | 24.33 |
| 0.2 | 4,400 | 41.00 |
| 0.1 | 2,200 | 91.00 |

The macromolecular structure of the bimodal resins that can be obtained by using the air (oxygen) termination or the polymerization-partial termination-polymerization procedures can be varied significantly if more than one monomer is used in the described processes. For example, in the case of two monomers, one can obtain a bimodal resin in which the low molecular weight component is composed of a homopolymer block of a monomer A, and the high molecular weight component is composed of a homopolymer block of a monomer B, or vice-versa. Furthermore, one can design a resin in which the low molecular weight component is a homopolymer block, and the high molecular weight component is a copolymer of the two monomers, or vice-versa. Or, one can design and produce a bimodal resin in which both the the low and high molecular weight components are copolymers of the two monomers, with the same composition (monomer ratio), or with different monomer ratios in the low and high molecular weight components.

The bimodal resins of the present invention may be formulated into toner compositions for electrostatographic imaging processes. Particularly, the bimodal resins of the present invention are useful in the formulation of low melt, high gloss toner compositions.

The resins are generally present in the toner of the invention in an amount of from about 40% to about 98% by weight, and more preferably from about 70% to about 98% by weight, although they may be present in greater or lesser amounts, provided that the objectives of the invention are achieved. For example, toner resins of the invention can be subsequently melt blended or otherwise mixed with a colorant, charge enhancing additives, surfactants, emulsifiers, pigment dispersants, flow additives, and the like. The resultant product can then be pulverized by known methods such as milling to form toner particles. The toner particles preferably have an average volume particle diameter of from about 5 microns to about 25 microns, more preferably from about 5 microns to about 15 microns.

Various suitable colorants can be employed in toners of the invention, including suitable colored pigments, dyes, and mixtures thereof including Carbon Black, such as Regal 330® carbon black (Cabot), Acetylene Black, Lamp Black, Aniline Black, Chrome Yellow, Zinc Yellow, Sicofast Yellow, Luna Yellow, Novaperm Yellow, Chrome Orange, Bayplast Orange, Cadmium Red, Lithol Scarlet, Hostaperm Red, Fanal Pink, Hostaperm Pink, Lithol Red, Rhodamine Lake B, Brilliant Carmine, Heliogen Blue, Hostaperm Blue, Neopan Blue, PV Fast Blue, Cinquassi Green, Hostaperm Green, titanium dioxide, cobalt, nickel, iron powder, Sicopur 4068 FF, and iron oxides such as Mapico Black (Columbia), NP608 and NP604 (Northern Pigment), Bayferrox 8610 (Bayer), MO8699 (Mobay), TMB-100 (Magnox), mixtures thereof and the like.

The colorant, preferably carbon black, cyan, magenta and/or yellow colorant, is incorporated in an amount sufficient to impart the desired color to the toner. In general, pigment or dye is employed in an amount ranging from about 2% to about 60% by weight, and preferably from about 2% to about 7% by weight for color toner and about 5% to about 60% by weight for black toner.

Various known suitable effective positive or negative charge enhancing additives can be selected for incorporation into the toner compositions of the present invention, preferably in an amount of from about 0.1% to about 10% by weight, and more preferably from about 1% to about 3% by weight. Examples include quaternary ammonium compounds inclusive of alkyl pyridinium halides; alkyl pyridinium compounds, such as those disclosed in U.S. Pat. No. 4,298,672, the disclosure of which is totally incorporated herein by reference; organic sulfate and sulfonate compositions, such as those disclosed in U.S. Pat. No. 4,338,390, the disclosure of which is totally incorporated herein by reference; cetyl pyridinium tetrafluoroborates; distearyl dimethyl ammonium methyl sulfate; aluminum salts such as Bontron E84™ or E88™ (Hodogaya (chemical); mixtures thereof, and the like.

Additionally, other internal and/or external additives may be added in known amounts for their known functions.

The resulting toner particles optionally can be formulated into a developer composition by mixing with carrier particles. Illustrative examples of carrier particles that can be selected for mixing with the toner composition prepared in accordance with the present invention include those particles that are capable of triboelectrically obtaining a charge of opposite polarity to that of the toner particles. Accordingly, in one embodiment the carrier particles may be selected so as to be of a negative polarity in order that the toner particles which are positively charged will adhere to and surround the carrier particles. Illustrative examples of such carrier particles include granular zircon, granular silicon, glass, steel, nickel, iron ferrites, silicon dioxide, and the like. Additionally, there can be selected as carrier particles nickel berry carriers as disclosed in U.S. Pat. No. 3,847,604, the entire disclosure of which is totally incorporated herein by reference, comprised of nodular carrier beads of nickel, characterized by surfaces of reoccurring recesses and protrusions thereby providing particles with a relatively large external area. Other carriers are disclosed in U.S. Pat. Nos. 4,937,166 and 4,935,326, the disclosures of which are totally incorporated herein by reference.

The selected carrier particles can be used with or without a coating, the coating generally being comprised of fluoropolymers, such as polyvinylidene fluoride resins, terpolymers of styrene, methyl methacrylate, and a silane, such as triethoxy silane, tetrafluoroethylenes, other known coatings and the like.

The diameter of the carrier particles is generally from about 50 microns to about 1,000 microns, preferably about 200 microns, thus allowing these particles to possess sufficient density and inertia to avoid adherence to the electrostatic images during the development process. The carrier particles may be mixed with the toner particles in various suitable combinations. However, best results are obtained when about 1 part carrier to from about 10 parts to about 200 parts by weight of toner are mixed.

Toners of the present invention may be used in known electrostatographic imaging methods, although the fusing energy requirements of some of those methods can be reduced in view of the advantageous fusing properties of the toner of the invention as discussed herein. Thus for example, the toners or developers of the invention can be charged, e.g., triboelectrically, and applied to an oppositely charged latent image on an imaging member such as a photoreceptor or ionographic receiver. The resultant toner image can then be transferred, either directly or via an intermediate transport member, to a support such as paper or a transparency sheet. The toner image can then be fused to the support by application of heat and/or pressure, for example with a heated fuser roll.

One skilled in the art will recognize that the above resin characteristics, monomer ratios and polymerization process may be adjusted as necessary to achieve a resin with specific characteristics. The following examples illustrate specific embodiments of this invention. Parts and percentages are by weight unless otherwise indicated.

EXAMPLES

Example 1

This example describes the production of a bimodal styrene/butadiene resin using an anionic polymerization process with the air termination procedure. The styrene/butadiene anionic polymerization process is carried out in a 1L glass jacketed reactor under a dry nitrogen blanket. The reactor is charged with 350 mL of cyclohexane, 300 mL of tetrahydrofuran, and 0.9 g of alpha-methyl styrene at room temperature. The mixture is stirred at 500 rpm. The solution is titrated with 2.0M n-butyllithium solution in cyclohexane until a blood red color indicative of living alpha-methyl styryl ions appears. The solution is then cooled to −17° C. When the reactor temperature reaches −17° (2, 2.54 g of 2.0M n-butyllithium solution in cyclohexane is charged to the reactor. At this point a feed consisting of 88.8 g of styrene and 28.1 g of butadiene is fed continuously via a metering pump at 3.85 mL/min into the reactor. The continuous feed of monomer allows temperature control within ±5° C. Good temperature control is believed to be important for tailoring molecular weight properties of the resin. After monomer addition is completed, another 70 minutes is allowed for the reaction. Using a 100 mL syringe, 80 mL of air is added to the reaction mixture and a sample of the polymer solution is analyzed by the GPC method. This sample is indicated as sample 1 in FIG. 1. A second sample (sample 2) is obtained after another 40 mL of air is added to the reaction mixture. A third sample (sample 3) is obtained after another 80 mL of air is added to the reaction mixture. A fourth sample (sample 4) is obtained after another 45 mL of air is added to the reaction mixture. After 245 mL of air is added to the reactor, the characteristic color of living ions is lost, indicating termination of living polymer chain ends.

The weight percent of the high molecular weight portion of the bimodal resin is proportional to the amount of air introduced into the reaction mixture. As shown in Table 1 below, the molecular weight of the high molecular weight material is twice the molecular weight of the low molecular weight material.

Example 2

Figure 3:
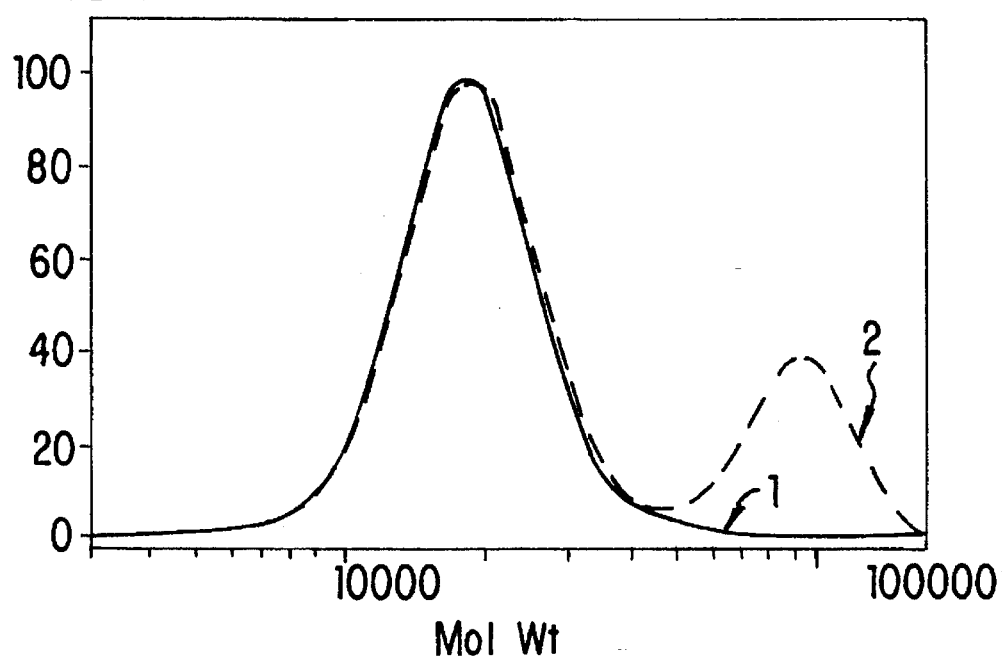
FIG. 3 shows GPC traces of samples from the polymerization process of Example 2.

This example describes the polymerization-partial termination-polymerization procedure as used in an anionic polymerization process to produce a bimodal styrene/butadiene resin. The styrene/butadiene anionic polymerization process is carried out in a 1L glass jacketed reactor under a dry nitrogen blanket. The reactor is charged with 350 mL of cyclohexane, 300 mL of tetrahydrofuran, and 0.8 g of alpha-methyl styrene at room temperature. The mixture is stirred at 500 rpm. The solution is titrated with 2.0M n-butyllithium solution in cyclohexane until a blood red color indicative of living alpha-methyl styryl ions appears. The solution is then cooled to −17° (2. When the reactor temperature reaches −17° (2, 3.05 g of 2.0M n-butyllithium solution in cyclohexane is charged to the reactor. At this point a feed consisting of 124.3 g of styrene and 42.2 g of butadiene is fed continuously via a metering pump at 3.0 mL/min into the reactor. After 75% of the monomer is added to the reactor, the monomer flow to the reactor is stopped. One extra hour is allowed for complete monomer conversion. A sample of the resin composition after the one hour is extracted from the reactor vessel and analyzed using the GPC method. The GPC trace of the sample is shown in FIG. 3 as sample 1. Following the hour, about 88% of living polymer chains are terminated with 1M butanol in xylene. Monomer feed is then resumed at 3.0 mL/min and the rest of the monomer is fed into the reactor over 17 minutes. After an additional 60 minutes of stirring, the reactor is heated to 20° (2. After another 30 minutes the reaction is terminated. The resultant polymer is precipitated in methanol and dried at 50° C. in vacuum. The GPC trace of the final product is shown in FIG. 3 as sample 2.

Both the high molecular weight and low molecular weight material have approximate styrene/butadiene compositions of 75/25. GPC analysis shows that the high molecular weight portion of the resin is 4.2 times the molecular weight of the low molecular weight portion of the resin. The molecular weight and glass transition temperature of the bimodal resin are shown in Table 1. The yield is 83%.

Example 3

Figure 4:
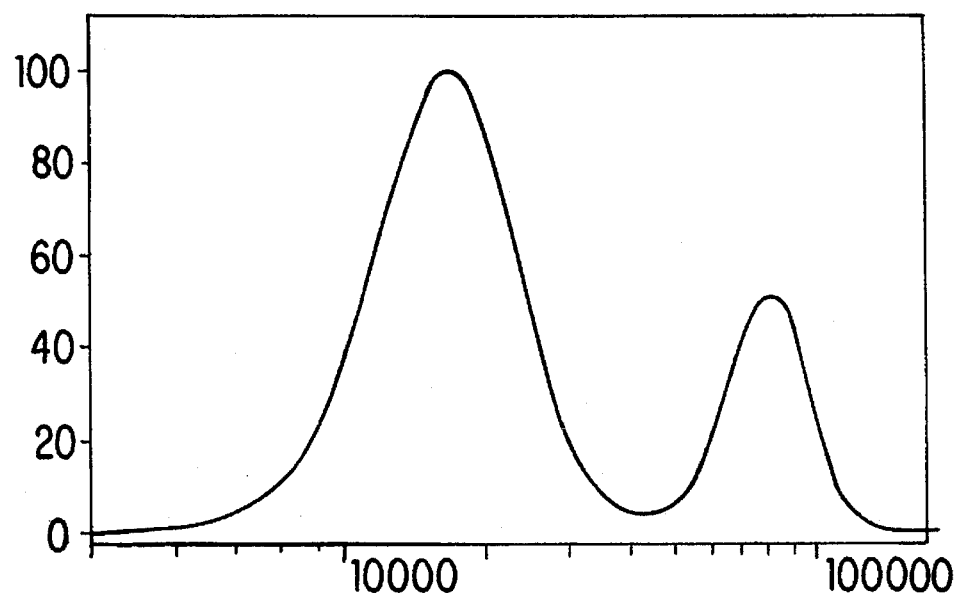
FIG. 4 shows the GPC trace of the bimodal resin of Example 3.

This example describes the polymerization-partial termination-polymerization procedure as used in an anionic polymerization process to produce a bimodal styrene/butadiene resin. The styrene/butadiene anionic polymerization process is carried out in a 1L glass jacketed reactor under a dry nitrogen blanket. The reactor is charged with 350 mL of cyclohexane, 300 mL of tetrahydrofuran, and 0.8 g of alpha-methyl styrene at room temperature. The mixture is stirred at 500 rpm. The solution is titrated with 2.0 M n-butyllithium solution in cyclohexane until a blood red color indicative of living alpha-methyl styryl ions appears. The solution is then cooled to −17° C. When the reactor temperature reaches −17° C., 2.97 g of 2.0 M n-butyllithium solution in cyclohexane is charged to the reactor. At this point a first monomer feed consisting of 107.8 g of styrene and 22.5 g of butadiene is fed continuously via a metering pump at 3.0 mL/min into the reactor. After the first monomer feed is added to the reactor, an extra hour is allowed for complete monomer conversion. A sample of the resin composition after the one hour is extracted from the reactor vessel and analyzed using the GPC method. Following the hour, about 90% of living polymer chains are terminated with 1M butanol in xylene. At this point a second monomer consisting of 29.3 g of styrene and 20.0 g of butadiene is fed continuously via a metering pump at 3.0 mL/min into the reactor. After the second monomer feed is added into the reactor, an additional four hours is allowed to complete monomer conversion, at which point the reaction is terminated. The resultant polymer is precipitated in methanol and dried at 50° C. in vacuum. The GPC trace of the final product is shown in FIG. 4.

The low molecular weight material thus produced as an approximate styrene/butadiene composition of 83/17. The high molecular weight material thus produced has an approximate styrene/butadiene composition of 60/40. GPC analysis shows that the high molecular weight portion of the resin is 4.8 times the molecular weight of the low molecular weight portion of the resin. The molecular weight and glass transition temperature of the bimodal resin are shown in Table 1. The yield is 75%.

Comparative Example 1

This example describes the preparation of a monomodal styrene/butadiene resin in an anionic polymerization process. A ten gallon pilot plant reactor is charged with 10.9 kg of cyclohexane, 10.7 kg of tetrahydrofuran and 40 mL of alpha-methyl styrene. The solution is titrated with 2.0M n-butyllithium solution in cyclohexane until a blood red color indicative of living alpha-methyl styryl ions appears. The solution is then jacket cooled to −23.5° C. 86 g of 2.0M n-butyllithium solution in cyclohexane is charged to the reactor as initiator. At this point, a feed consisting of 1,300 g of butadiene dissolved in 3,900 g of styrene is fed continuously via a metering valve at 65–70 mL/min into the reactor. After the addition of the monomers is completed, another two hours is allowed for the completion of the reaction. The polymer in solution is recovered by precipitating the polymer into 160L of cold methanol, followed by filtration and drying. The resulting polymer is monomodal, as shown by the molecular weight properties in Table 1. The yield is greater than 95%.

Toner Preparation

Cyan toners are prepared from the monomodal styrene/butadiene resin of Comparative Example 1 and the bimodal styrene/butadiene resin of Example 2. Both toners are formulated with 98% resin and 2% PV Fast Blue cyan pigment. The molecular weight properties and glass transition temperature of the toner compositions are shown in Table 2. The glass transition temperature, butadiene content and the low molecular weight portion of both resins are similar. However, the major difference between the resins is the monomodal versus the bimodal molecular weight distribution.

Unfused images with toner mass per area (TMA) of 1.2 mg/cm$^2$ are produced for both toners on Hammermill laser print paper using a modified Mita copier. These images are then fused on a Barcelona color fusing bread board at a process speed of 80 mm/s and a 75 ms dwell time using amino release oil at an oil rate of 12 mg/copy. Subsequently, gloss and crease area measurements are carried out and the fusing properties of each toner are determined. Gloss, fix and latitude data for each toner are summarized in Table 3. The gloss and fix properties of both styrene/butadiene toners are similar; however, the hot offset temperature (HOT) is significantly higher, by 20° C., for the toner produced from the bimodal styrene/butadiene resin. The fusing temperature required for a gloss level of 50 ($T_{G50}$) and the fusing temperature ($T_{C65}$) are both 130° C. for the bimodal styrene/butadiene toner. Therefore, both acceptable gloss and fix may be achieved for this toner by fusing at 130° C. The HOT for the bimodal toner is 190° C., resulting in a 60° C. fusing latitude. On the other hand, the $T_{G50}$ for the monomodal toner is 124° C. but the $T_{C65}$ is 131° C. Therefore, to achieve both acceptable gloss and fix properties, the monomodal toner would also have to be fused at approximately 130° C. The HOT for the monomodal styrene/butadiene toner is 170° C., resulting in a 39° C. fusing latitude, which is significantly lower than the 60° C. fusing latitude achieved for the bimodal toner.

TABLE 1

Analytical Data For Resins

Resin Characterization

| Example # | Low MW Peak [K] | MWD | High MW Peak [K] | MWD | Tg [°C.] | Comments |
|---|---|---|---|---|---|---|
| Example 1 | 25.0 | 1.10 | 50.0 | 1.10 | 49.3 | Bimodel resin by Air Termination process |
| Example 2 | 17.9 | 1.09 | 74.7 | 1.05 | 50.1 | Bimodal resin by Polymerization-Partial Termination-Polymerization process |
| Example 3 | 16.6 | 1.15 | 80.0 | 1.05 | 57.2 | Bimodal resin by Polymerization-Partial Termination-Polymerization process |
| Comparative Example 1 | 30.8 | 1.10 | — | — | 51.0 | Monomodal Resin |

TABLE 2

Analytical Data For Toners

Toner Characterization

| Example # | Low MW Peak [K] | MWD | High MW Peak [K] | MWD | Tg [°C.] | Comments |
|---|---|---|---|---|---|---|
| Example 2 | 19.4 | 1.11 | 72.1 | 1.06 | 51.6 | Bimodal resin by Polymerization-Partial Termination-Polymerization process |
| Comparative Example 1 | 28.9 | 1.10 | — | — | 50.2 | Monomodal resin |

TABLE 3

Fusing Data for Toners

| Example # | Gloss Temperature (°C.) $T_{G50}$ | $T_{G60}$ | $T_{G70}$ | Gloss Temp Difference (°C.) $\Delta T_{G50}$ | $\Delta T_{G60}$ | $\Delta T_{G70}$ | Peak Gloss $G_{max}$ | HOT (°C.) | Gloss Latitude (°C.) | $T_{C65}$ (°C.) | $T_{C65}$ (°C.) | Fix Latitude (°C.) |
|---|---|---|---|---|---|---|---|---|---|---|---|---|
| Comparative Example 1 | 124 | 129 | 135 | −2 | −2 | −1 | 82 | 170 | 46 | 131 | +12 | 39 |
| Example 2 | 130 | 134 | 140 | +4 | +3 | +4 | 81 | 190 | 60 | 130 | +11 | 60 |

What is claimed is:

1. A one-step polymerization process for producing a resin, comprising:
   (a) initiating an anionic polymerization of a monomer or monomers in a reaction vessel to produce living polymer chains;
   (b) terminating a first portion of said living polymer chains by controllably adding to the reaction vessel one of:
      (i) at least one of air and oxygen to cause the termination of a portion of the living polymer chains by coupling of the living polymer chains, and
      (ii) a quenchant selected from the group consisting of aliphatic and aromatic alcohols to cause the termination of a portion of the living polymer chains; and
   (c) completing the polymerization of a remaining portion of said living polymer chains;
   wherein said resin is a bimodal resin having a distinct low molecular weight portion and a high molecular weight portion.

2. The process of claim 1, wherein said termination step (b) is a partial termination step, comprising controllably adding at least one of air and oxygen to the reaction vessel to cause the termination of a portion of the living polymer chains by coupling of the living polymer chains.

3. The process of claim 2, wherein said termination step (b) comprises controllably adding air to the reaction vessel to cause the termination of a portion of the living polymer chains.

4. The process of claim 2, wherein said termination step (b) comprises controllably adding oxygen to the reaction vessel to cause the termination of a portion of the living polymer chains.

5. The process of claim 2, wherein said termination step (b) is performed only after all of the monomer or monomers has been added to the reaction vessel and the termination of the remaining portion of living polymer chains is accomplished by one of reaction with impurities or addition of a quenchant.

6. The process of claim 5, wherein said resin has a separation factor between said low molecular weight portion and said high molecular weight portion of about two.

7. The process of claim 1, wherein said termination step (b) is a partial termination step, comprising controllably adding said quenchant to the reaction vessel to cause the termination of a portion of the living polymer chains.

8. The process of claim 1, wherein said termination step (b) is performed before all of the monomer or monomers has been added to the reaction vessel, and said completion step (c) comprises the steps of:
   (d) adding additional monomer or monomers to the reaction vessel;
   (e) polymerizing a remaining portion of said living polymer chains; and
   (f) terminating the anionic polymerization.

9. The process of claim 8, wherein said monomer or monomers in said initiation step (a) is the same as the additional monomer or monomers in said addition step (d).

10. The process of claim 8, wherein said monomer or monomers in said initiation step (a) is different from said additional monomer or monomers in said addition step (d).

11. The process of claim 8, wherein at least one of said monomer or monomers in said initiation step (a) and said additional monomer or monomers in said addition step (d) is a mixture of two or more different monomers.

12. The process of claim 1, wherein said anionic polymerization initiation is produced by an initiator system comprising an organolithium compound.

13. The process of claim 1, wherein said polymerization of living polymer chains is conducted in a solvent or mixture of solvents.

14. The process of claim 1, wherein at least one of said monomer or monomers is selected from the group consisting of conjugated dienes and vinyl monomers.

15. The process of claim 1, wherein at least one of said monomer or monomers is selected from the group consisting of styrene, isopreene and butadiene.

16. The process of claim 1, wherein said process is a batch or semi-batch process.

17. The process of claim 16, wherein said process is a semi-batch process comprising adding said monomer or monomers to the reaction vessel at a controlled rate.

18. The process of claim 1, wherein one of said low molecular weight portion and said high molecular weight portion of said resin has a molecular weight distribution of less than about 1.2.

19. The process of claim 1, wherein both of said low molecular weight portion and said high molecular weight portion of said resin have a molecular weight distribution of less than about 1.2.

20. The process of claim 1, wherein both of said low molecular weight portion and said high molecular weight portion of said resin have a molecular weight distribution of from about 1.05 to about 1.2.

* * * * *